(12) United States Patent
Vincent

(10) Patent No.: US 8,126,868 B1
(45) Date of Patent: Feb. 28, 2012

(54) SEARCH RANKINGS WITH DYNAMICALLY CUSTOMIZED CONTENT

(75) Inventor: Brent Allen Vincent, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 434 days.

(21) Appl. No.: 12/256,277

(22) Filed: Oct. 22, 2008

(51) Int. Cl.
*G06F 17/30* (2006.01)
(52) U.S. Cl. ........................................ 707/708
(58) Field of Classification Search .................. 707/708, 707/711, 715, 713
See application file for complete search history.

(56) References Cited

U.S. PATENT DOCUMENTS

| | | | |
|---|---|---|---|
| 7,921,097 B1* | 4/2011 | Dandekar et al. | 707/707 |
| 2002/0083132 A1* | 6/2002 | Holland et al. | 709/203 |
| 2002/0184179 A1* | 12/2002 | Siegel et al. | 707/1 |
| 2005/0165638 A1* | 7/2005 | Piller | 705/14 |
| 2007/0168465 A1 | 7/2007 | Toppenberg et al. | |
| 2007/0250468 A1* | 10/2007 | Pieper | 707/1 |
| 2009/0094137 A1* | 4/2009 | Toppenberg et al. | 705/27 |

* cited by examiner

*Primary Examiner* — Thu-Nguyet Le
(74) *Attorney, Agent, or Firm* — Thomas, Kayden, Horstemeyer & Risley & LLP.

(57) ABSTRACT

A server identifies descriptors related to an item of content and inserts them into an address of a template web page. The server extracts the keywords in the address after receiving a request for the web page from an application program. Content relating to the descriptors is determined and associated with the web page, thereby creating a customized web page. In response to the request, the server provides the customized web page to the application program.

26 Claims, 7 Drawing Sheets

SEARCH RANKINGS WITH DYNAMICALLY CUSTOMIZED CONTENT

BACKGROUND

When a user issues a query to a search engine, the search engine consults an index of web pages and their associated content to determine a list of relevant web pages to return to the user as search results. The search engine employs a variety of methods to generate the index of web pages including, for example, the use of web crawlers or spiders. The search engine further employs various methods for ranking or weighting the indexed web pages. The weighting aids in determining a placement order of the indexed web pages returned as search results.

One existing method for ranking or weighting the indexed web pages is to compare the contents of the web page with the uniform resource locator (URL) for that web page. A high correspondence between the contents of the web page and the terms or components of the URL results in high relevancy for the contents. Such existing methods product high relevancy for static URLs only, however, and fail to associate a high relevancy to web pages dynamically created via query strings in the URL. Dynamic web pages and associated URLs are generated based on an individual user's request for particular content.

Web sites that want to improve the search engine rankings for their web pages may then abandon dynamically generated content and create separate, static web pages for each possible user request for content. However, creating and maintaining these static web pages is time-consuming, expensive, and is not an optimal solution when managing very large websites.

BRIEF DESCRIPTION OF THE DRAWINGS

Corresponding reference characters indicate corresponding parts throughout the drawings.

DETAILED DESCRIPTION

Figure 1:
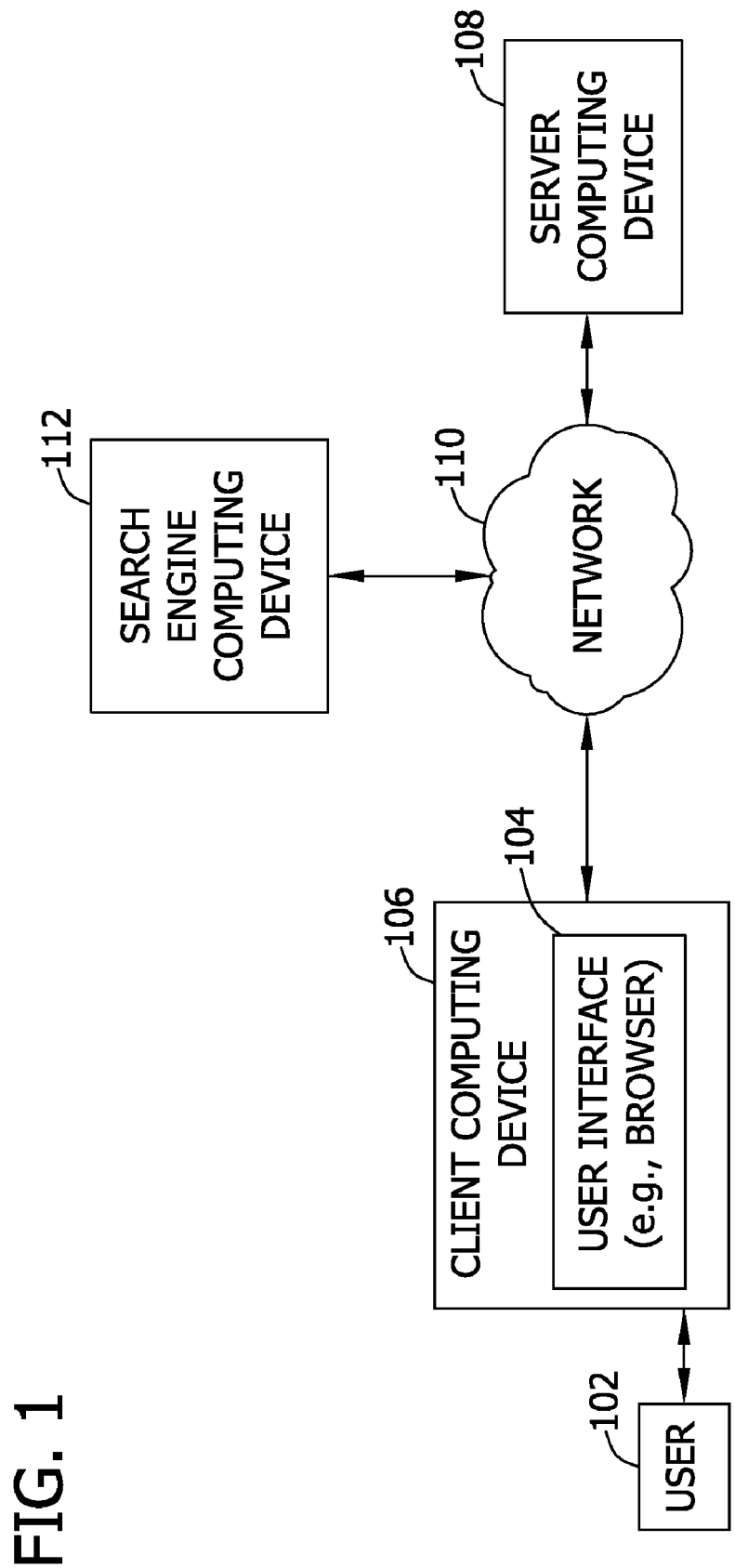
FIG. 1 is a block diagram illustrating an example system according to an embodiment in which a client computing device communicates with a server computing device and a search engine computing device via a network.

Disclosed embodiments enable dynamically generated documents to be effectively indexed and assigned a high relevancy ranking or positioning by a search engine such as shown in FIG. 1. In embodiments such as FIG. 1, web pages represented by uniform resource locators (URLs) are indexed and ranked by the search engines. While examples are described herein with reference to products and services, other types of content are contemplated as well. For instance, the disclosed embodiments may be implemented for other types of offerings. Embodiments are also not limited to apply only to users, human or otherwise. A user is an ordinary human user or the user is a computer program or application (e.g., a "bot"). Further, while the embodiment of FIG. 1 illustrates a client-server relationship between the computing devices, other configurations are contemplated such as a peer-to-peer relationship between the computing devices.

Conventional hypertext navigation occurs among "static" documents, and, for web users, this experience occurs using static web pages. In contrast, dynamic web pages may be generated on-the-fly from various content stored in one or more locations. Thus, content in dynamic web pages, such as text, images, form fields, etc., on a web page may change in response to different contexts or conditions. Among other benefits, this eliminates the need to store and maintain individual web pages. Instead, according to some embodiments, web pages are built from templates and, using server side scripting, these templates are populated with information from the data stores that populate the template. Such data stores could be one or more databases, among other possibilities. Template web pages define the layout and content of information displayed on the web page. A server then retrieves information from a database and inserts into the appropriate portions of the template, thereby creating a customized web page that is referenced by a dynamic URL. Thus, URL's designating web pages having dynamic content will be referred to herein as dynamic URLs (as opposed to static URLs). As one example, web pages on e-commerce web sites relating to specific products or services are often represented by dynamic URLs. Particular information relating to a product or service may be contained in a database. A server generates a web page in response to a query by a user, retrieving the particular information from a database and modifying a template web page to generate a customized web page. A dynamic URL then represents the generated web page.

The content of web pages referenced by static URLs, however, is determined by the information contained in a respective hypertext markup language (HTML) or similar type file. The utilization of dynamic URLs therefore permits a plurality of web pages to be modified by making a single modification to the information contained in the database, while in a static URL scenario each individual web page must be modified.

Disclosed embodiments aid in, among other potential benefits, improving search engine rankings or positioning for web pages maintained on a server computing device 108 such as illustrated in FIG. 1. A customer (or user) 102 accesses the network 110 via a client computing device 106. The network 110 is any type of network that communicatively couples a plurality of computing devices. Examples of the network 110 are the internet, a peer to peer (P2P) network, a local area network (LAN), or a wide area network (WAN).

A client computing device 106 is any device capable of accessing the network 110. By way of example only, and not limitation, these devices include a laptop, a desktop computer, a set-top box, a handheld device such as an electronic book reader, a cellular phone or smart phone or a video gaming device. The client computing device 106 includes a form of computer readable media. The computer readable media stores, among other things, applications or programs. The client computing device 106 includes user input devices that enable the user to enter information into the client computing device 106. These include, for example, a keyboard, a pointing device, or an audio input device. The client computing device 106 also includes one or more output devices. These include, for example, a graphical display device or an audio output device.

Stored on the computer readable media on the client computing device 106 is a user interface 104 such as, among other possibilities, a web browser. Web browsers enable users to display and interact with media and other information typically located on a web page or a website on a server computing device 108.

Server computing device 108 is communicatively coupled through the network 110 to the client computing device 106. Server computing device 108 is any type of server that contains a processor operable to execute computer executable instructions and a memory to store and retrieve information. In some embodiments, server computing device 108 hosts an e-commerce web site. In some embodiments, however, server computing device 108 is a blog website, news website, social network web site or a dating web site, among many other possibilities.

Search engine computing device 112 provides search results in response to the receiving of a search query from a user 102. Residing on the search engine computing device 112 is a search engine. The search engine aids users in locating resources on the internet in response to the user's search query. The search engine computing device 112 communicates to the client computing device 106 a web page that permits entry of a search query by the user 102. The web page is presented to the user 102 through the user interface 104.

The user 102 enters the search query into the user interface 104 of the client computing device 106 through one of the user input devices. The search query is communicated over the network 110 to the search engine computing device 112. The search engine, executing on the search engine computing device 112 then consults an index of URLs and corresponding web pages and web sites and associated content to determine a list of web sites or pages that are relevant to the search query. The index is maintained by the search engine computing device 112 or a third-party on another server (not shown). The search engine employs algorithms to aid in the selection and ranking of the results according to their likely relevance to the search query. Results ranked higher in the list are deemed likely to be more relevant to the search query than those ranked lower in the list. Not surprisingly, owners of web sites and web pages often desire to have their respective sites or pages ranked high in the list to attract users to their sites.

After the list is generated, it is communicated over the network 110 to the client computing device 106 and presented to the user 102 through the user interface 104. The list may take the form of a plurality of hypertext links to web pages, that, when selected by the user 102, redirects the web browser to the selected link.

The index of web pages maintained by the search engine computing device 112 is created by a web crawler or similar device. The web crawler is "seeded" with a plurality of URLs for corresponding web pages. The web crawler then automatically follows the URLs and analyzes the corresponding web pages for their content. The address or URL of the web page and an association with its respective content is then stored in a database which contains the search engine index. Depending on the type of index, none, some or all of the content associated with the web page may also be stored in the database. In addition, keywords and relevance information associated with the content may be stored in the index. The database may be located on the search engine computing device 112 or a third-party server (not shown).

While analyzing web pages for their content, the web crawler also determines if the web page contains any links to additional URLs. The web crawler then follows these additional URLs and repeats the process over again, analyzing the content of the corresponding web pages and storing it in a database. The web crawler continues this process, analyzing an ever-larger group of URLs and corresponding web pages. The web crawler ceases "crawling" after a pre-determined period of time, or based on other criteria. The web crawler may initiate "crawling" operations at set time intervals, such as every day, week, or month; or according to other criteria.

The operation of the web crawler yields satisfactory results for static URLs and corresponding web pages, as discussed above. However, that is not the case in regards to dynamic URLs (e.g., URLs having query strings). Web crawlers often truncate the URL after encountering unrecognizable characters such as the question mark that precedes the query string. As such, the web crawlers consider many of the dynamic URLs to be duplicates. For example, the two URLs below are considered duplicated by web crawlers because the text preceding the question marks is identical.

www.****.com/Brake_Pads/index.html?Car=1970_ModelT www.****.com/Brake_Pads/index.html?Car=1970_ModelA Accordingly, dynamic URLs and corresponding web pages are often not included in lists of search results or are not ranked as high as their content would otherwise suggest they should be.

Figure 2:
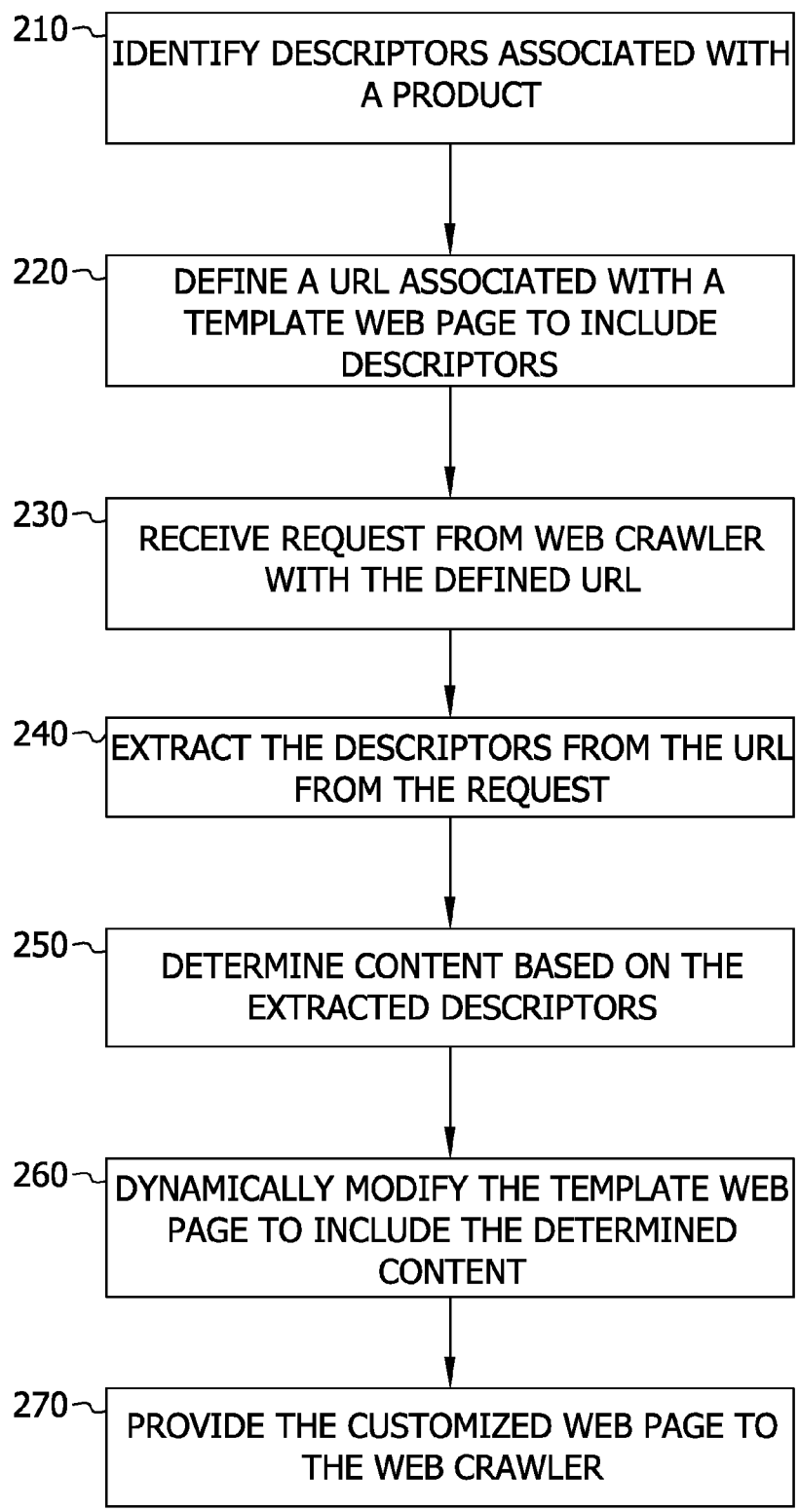
FIG. 2 is an example flow chart for a method of improving search engine rankings for web pages.

Turning next to FIG. 2, a flow chart illustrating a method of improving search engine rankings for web pages is presented. The method begins at block 210 with the identification of descriptors associated with a product. The descriptors include one or more of a term, a code, a keyword, or a phrase that serve to identify the product. For instance, assume the product is an oil filter, one phrase is "oil filter". A term or code may be a part or serial number associated with the oil filter. A keyword is simply "filter". When combined together, keywords form phrases.

Additionally, the descriptors may define other information about the product, such as other products that it is compatible therewith. In the oil filter example, descriptors may, for example, identify which vehicles are compatible with the oil filter. A descriptor phrase comprising information describing the vehicle and words filter or oil filter may be identified. Other phrases include the vehicle that oil filter fits and the phrase "oil filter". The phrase "1997 XYZ sedan oil filter" is an example of such a phrase.

A database or other memory is consulted to identify the descriptors associated with the product. The database includes descriptors for each product. In an embodiment, the manufacturer or seller of the product supplies the descriptors. Alternatively or in addition thereto, the descriptors are identified by consulting a search query click log. The click log contains search queries issued by users and respective URLs selected in response to the search queries. Search queries issued by users who selected URLs related to the product are then identified as keywords or phrases associated with the product. Additional criteria may be applied to the association, such as a requirement that a particular query and respective URL pair be issued a set number of times by a set number of different users before the query is identified as a descriptor and associated with the product. Users of the e-commerce web site supply the descriptors in a collaborative manner, in another embodiment.

In block 220 a URL associated with a template web page is defined to include the descriptors identified in block 210. In the oil filter example, the URL is defined to include the domain name, followed by the any of the identified descriptors. A URL of www.******.com/1997-XYZ-sedan/oil-filter may be identified in accordance with embodiments. The asterisks represent the domain name of the e-commerce retailer.

Figure 6:
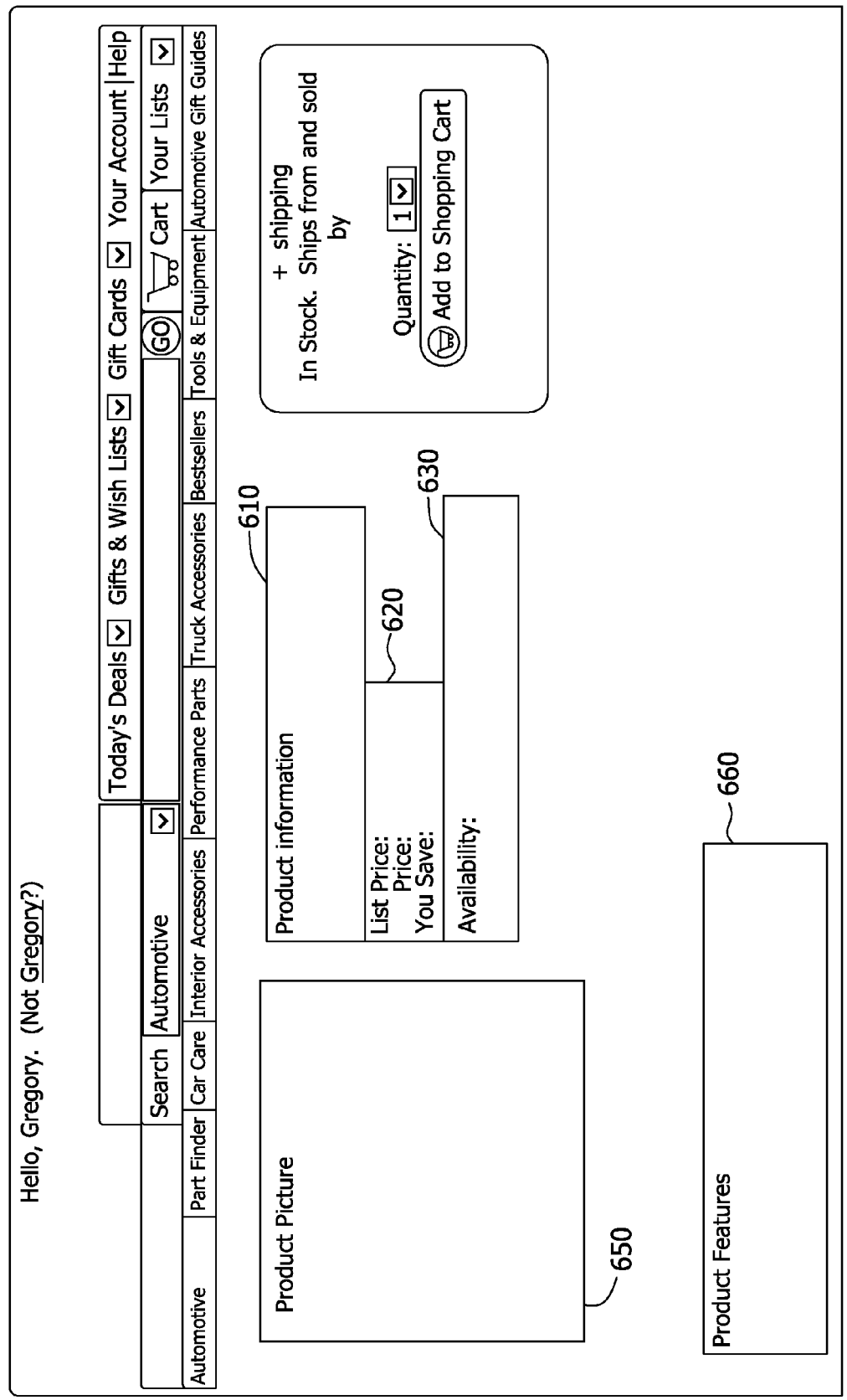
FIG. 6 is an example screen shot of a template web page having blank information fields for product information.

An example template web page is depicted in FIG. 6. The template web page defines the layout and types of information that are included in a product web page. According to some embodiments, within the template web page fields are reserved for specific types of information retrieved from a database. For instance, a field within the template may be reserved for an image, description, or price of the product. In the oil filter example, an image of the oil filter, description of the oil filter, and respective price are determined by consulting a database and are subsequently inserted into the template web page in the appropriate positions.

The template web page is accessible by a web crawler via the defined URL. The template web page may be stored on the server computing device in a directory or area that is accessible to other users and servers over the network. The template web page and associated URL may be registered or otherwise disclosed to the search engine to effect crawling of the template web page by the web crawler in a timely manner. However, not all search engines accept registration of web pages.

The defined URL therefore includes a path to the template web page and a portion of it includes the identified descriptors. The defined URL is a clean URL in some embodiments, including only the domain name and identified descriptors in the path or other reference to a document representing the web page. Placing the identified descriptors immediately adjacent to or immediately after the top-level domain improves the relative ranking or positioning of the web page by the search engine. Accordingly, in some embodiments the URLs are defined with at least one of the identified descriptors immediately placed after the top-level domain in the URL.

Web pages with descriptors embedded in the URL and located adjacent to the domain name are deemed more relevant by a search engine to a query and are ranked higher in the list of search results than otherwise equally relevant web pages. Web pages ranked higher in a list of search results are more likely to be selected by a user, and are therefore more desirable.

The web crawlers access the defined URL with the identified descriptors and send a request for the document associated with the defined URL in block 230. The received request includes the defined URL with the identified descriptors. In the oil filter example, the defined URL is www.*******.com/ 1997-XYZ-sedan/oil-filter. The identified descriptors are "1997 XYZ sedan" and "oil filter". The request takes the form of a typical request for the web page, as is commonly received from a web browser. The request is communicated to the server computing device over the network.

At block 240, the descriptors are extracted from the defined URL in response to the received request. The portions of the defined URL that include descriptors are identified as "1997 XYZ sedan" and "oil filter". The descriptors are extracted by the server computing device or any other computing device hosting the e-commerce retailer's web site and communicatively connected to the network.

Content for the product is determined based on the extracted descriptors in block 250. For instance, a database or other memory is consulted to determine content for the product based on the extracted descriptors of "1997 XYZ sedan" and "oil filter". In this instance, content for an oil filter for a 1997 XYZ sedan is determined. The content includes an image of the product, information describing the product, and a price of the product. According to other embodiments, more or less content may be determined for the product. For instance, video or audio content may be determined for some products. The video and audio content may depict the operation or installation of the product or the interaction of a user with the product.

The template web page is dynamically modified to include the determined content at block 260, creating a customized web page. Continuing with the oil filter example, the template web page is modified to include an image of the oil filter along with information describing the oil filter and a price of the oil filter. Additional information including a part number of the oil filter may be provided as well. Further, audio or video information may be determined content and included within the customized web page.

In block 270, the customized web page is provided to the web crawler. The customized web page is communicated over the network to the web crawler. The web crawler indexes the defined URL and the customized web page. In some embodiments, the web crawler adds or modifies an entry in a database accessible to the search engine. The entry includes the URL of the web page, information describing the content of the web page, and other information used by the search engine in generating lists of search results.

Figure 3:
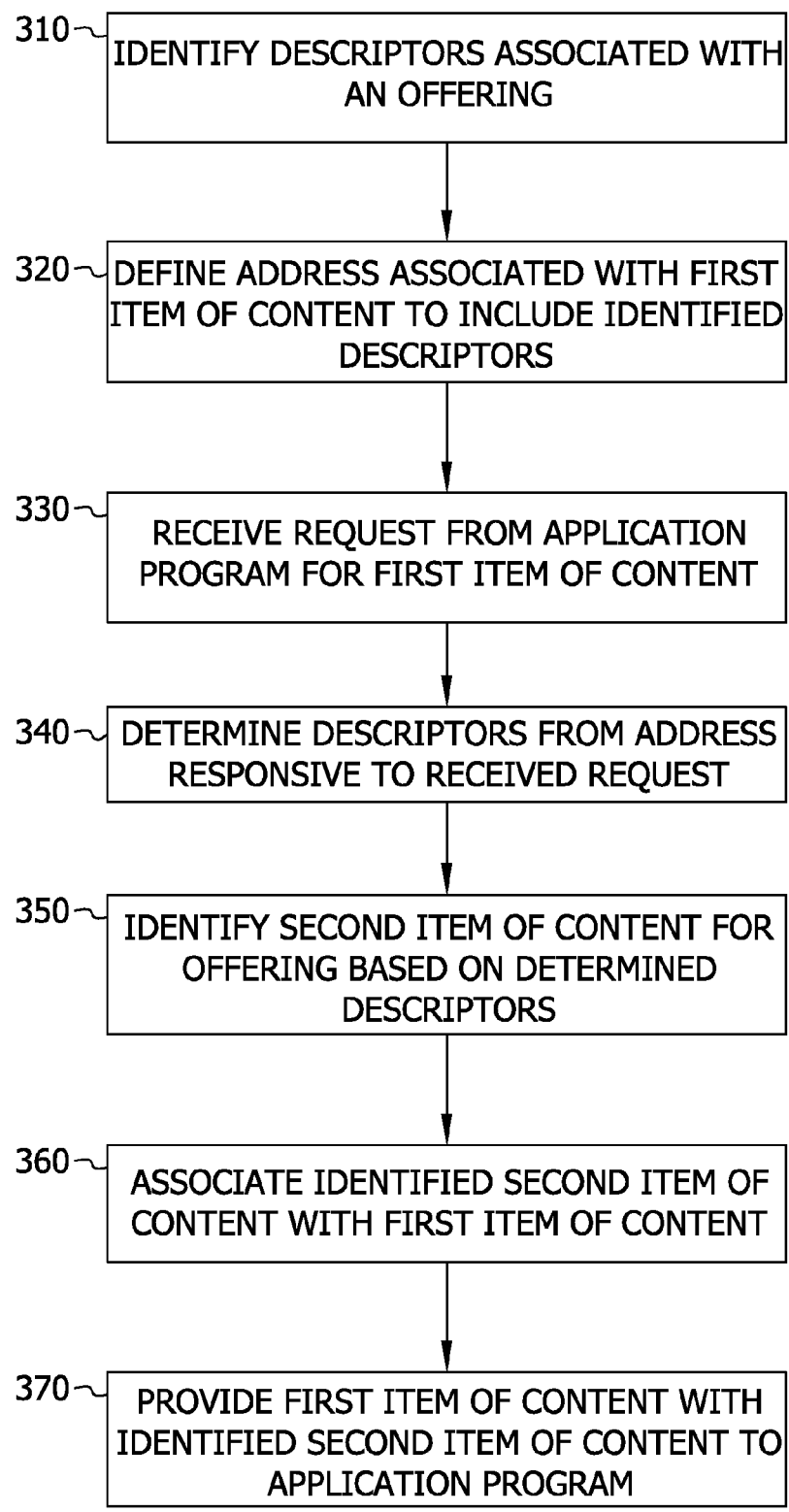
FIG. 3 is an example flow diagram illustrating a method for providing a first item of content with an identified second of content to an application program.

FIG. 3 provides a flow chart illustrating a method of providing a first item of content with an identified second item of content to an application program. While reference is made throughout the description of FIG. 3 to a single database containing information relating to descriptors, first and second items of content, and offerings, multiple databases residing on one or more servers are contemplated without departing from the scope of the embodiments.

Descriptors associated with an offering are identified at block 310. An offering includes, for example, a product, service, or social profile or any combination thereof. The descriptors are associated with the product, service, or social profile and serve to describe their content. For instance, if the product is "brake pads", the descriptors are the part number of the brake pads, the brand name and model of the brake pads, the material composition of the brake pads (e.g., ceramic-based or conventional organic), and the list of vehicles (e.g., make, model, relevant options, and year) that the brake pads fit.

The descriptors are identified according to a number of methods. A query click log may be examined to identify search queries that were issued and corresponding URLs selected in response. In the brake pads example, if users enter search queries with terms such as "1997 XYZ sedan brake pads" and select a specific web page related to a specific type of brake pads, a correlation is made between the search terms and the specific type of brake pads. The greater the number of times that different users issue the same or similar query and select the same pages in response, the higher the probability that the correlation is correct. Additionally, in some embodiments the query click log is analyzed to determine the search history of a user. For instance, if a user selects a web page from the search results they are presented with, and does not return to the search results to select another web page within a set period of time, there is high probability that the selected web page correlates to the search query.

The content of the search query is then a likely descriptor of the web page referenced by the URL and the offering contained on the web page. As described above, filtering techniques are applied in the analysis of the query click logs (e.g., requiring a set number of queries and selections of a web page by different users) to improve the level of accuracy of the association of descriptors and offerings. Query clicks logs are also referred to as web logs or the like. A user's browser history contains similar information as well and may be used to identify descriptions in the same manner.

In block 320, an address associated with a first item of content is defined to include the identified descriptors. The first item of content is accessible by an application program via the defined address. The first item of content may be a web page template, template document, audio file, image file, or video file.

According to some embodiments, the application program is a web browser or web crawler and the first item of content is a template document, such as a web page, a database record, a word processing document, or a spreadsheet document. The template document may be selected based on the identified descriptors. For example, there are different template documents for automotive parts, gemstones, and vacations. The defined address includes a reference or path to the first item of content, and a portion of the path includes the identified descriptors. The defined address may be a URL. In the example above, the defined address is http://www.*******.com/1997-XYZ-sedan/brake-pads.

A request is subsequently received from the application program for the first item of content in block 330. A web browser or a web crawler may issue the received request. Regardless of the source, the request is communicated to the server computing device over the network. The received request includes the defined address with the identified descriptors. The request in the brake pad example includes http://www.*******.com/1997-XYZ-sedan/brake-pads and is communicated by the application program over the network to the server computing device.

In block 340, responsive to the received request, the descriptors are determined or obtained from the address. In the brake pads example, the descriptors "1997 XYZ sedan" and "brake pads" are determined responsive to the request.

A second item of content is identified for the offering in block 350 based on the determined descriptors from block 340. The second item of content includes information relating to the offering. The descriptors are compared against entries in a database mapping descriptors to respective offerings. The database entries represent the correspondence between descriptors and the second item of content related to the offerings. Based on the comparison, the second item of content is determined. The second item of content includes additional information about the offering, such as the price of the offering, detailed information describing the offering, audio or video representations of the offering, or any other information that relates to the offering. In some embodiments, the second item of content includes audio, video, or image files related to the offering. In other embodiments, the second item of content includes textual metadata describing the offering.

In the brake pads example, the descriptors "1997 XYZ sedan" and "brake pads" are compared against the entries in the database to determine an offering that is associated with both descriptors. Consequently, a product that is associated with both descriptors is determined: brake pads that fit a 1997 XYZ sedan. The database is consulted again to identify second items of content for the offering. The second items of content are the price of the brake pads, detailed description of the pads, performance information concerning the fade resistance of the brake pads after repeated stops, an image of the brake pads, and the availability of the brake pads from the e-commerce retailer, in the present example.

The identified second item of content is associated with the first item of content in block 360. The association of the identified second item of content with the first item of content includes, for example, modifying a title of the template document to include the second item of content, modifying a description of a template document to include the second item of content, modifying a meta-description of the template document to include the second item of content, or modifying any other portion of the template document to include at least a portion of the second item of content. In the audio, image, and video file example, the template document is modified to include the metadata that was identified in block 350. In other embodiments, associated the second item of content with the first item of content does not include the use of any template document. Rather, the items of content may simply be combined together.

In the brake pad example, the meta-description of the template web page is modified to include the detailed descriptive information for the brake pads, including the price and availability from the e-commerce retailer. Additionally, the template web page is modified to include the second items of content therein. In some embodiments, not all of the second items of content are included into the first item of content. In these situations, the first item of content does not accept all types of information that correlate to the second items of content. For instance, the first item may not accept video content, and therefore the first item of content is not modified to include any available video-related second items of content.

At block 370, the first item of content modified with the identified second item of content is provided to the application program. The items of content may be provided in a web page, database entry, or other type of document and are communicated over the network to the client computing device for presentation to the user. In accordance with the brake pad example, a template web page with a modified meta-description and second items of content included therein is provided to a web browser or crawler.

In some embodiments (not shown), a plurality of addresses are defined for the first item of content. For example, each of the addresses includes a different set of descriptors. A subset of the addresses are selected and provided to the application program based on selection criteria (e.g., only selected addresses are surfaced). For example, only the addresses including the most popular descriptors are selected. Alternatively or in addition, the addresses are selected based on the application program, a context of the application program, a product category, a best seller or other list, or a location that the addresses will be stored. For example, different subsets of the addresses are placed on a web site map, a search page of a web site, a browse page of a web site, or web pages displaying products of a particular brand or category. In another example in which one web page displays only a certain brand of vehicle, only a subset of the addresses including descriptors related to that brand are surfaced.

Figure 4:
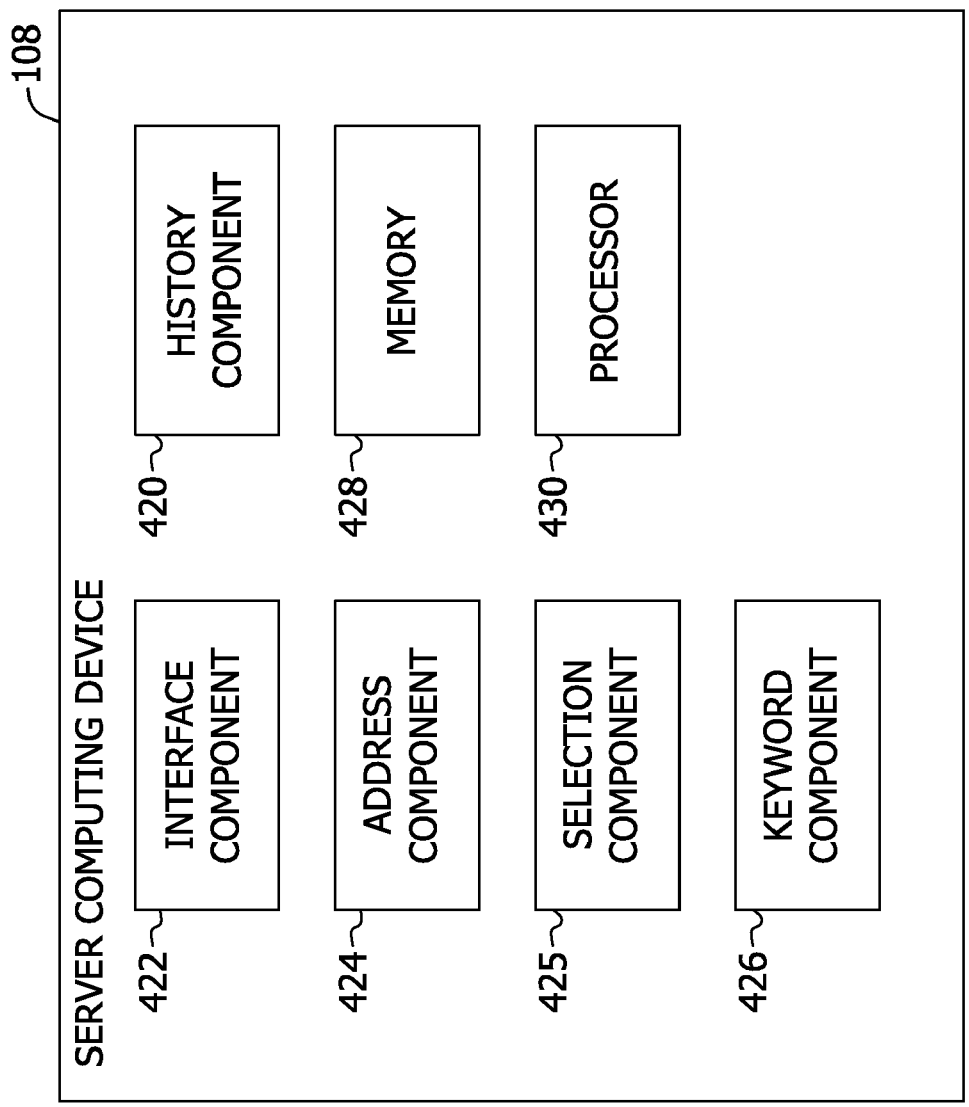
FIG. 4 is an example block diagram depicting the components of a server computing device.

Turning now to FIG. 4, a block diagram illustrates the exemplary server computing device 108 for executing an embodiment. Included within, or accessible by, the server computing device 108 are a memory 428, a processor 430, and a number of components, including, but not limited to a history component 420, an interface component 422, an address component 424, a keyword component 426, and a selection component 425.

The processor 430 is operable to execute computer executable instructions to read and write information to the memory 428. A correspondence between keywords and items of content is also stored in memory 428. Keywords and items of content have a correspondence when they are related to each other. For instance, if a keyword describes an item of content, the keyword and the item of content have a correspondence. The template documents, items of content, and correspondence between the items of content and keywords are stored in one or more portions of the memory 428. In some embodiments, the interface component 422, the history component 420, the address component 424, the keyword component 426, and the selection component 425 are stored within the memory 428.

The history component 420 maintains search statistics for a plurality of the items. The search statistics are associated with a search engine, in some embodiments. The search statistics include, for example, one or more of the following: log queries for the item information, a click-through conversion rate, and a frequency of keyword searches for the item. The frequency of the execution for each of the queries is included in the log, as well as the subsequent selection of item information from a list of search results generated in response to the query and the amount of time the user browses each of the items. The item information corresponds to services or products for sale, according to embodiments.

The keyword component 426 identifies descriptors associated with item information based on the queries maintained by the history component 420. The keyword component 426 analyzes the log maintained by the history component 420 to determine the queries issued by a user and the subsequent selection of item information in response to the queries. A high incidence of users selecting a particular piece of item information in response to the issuance of a particular query indicates a correlation between the content of the query and the item information. A greater number of queries and subsequent selections of item information indicates a greater likelihood that the content of the queries are accurate descriptors of the item. Consequently, the keyword component 426 defines the descriptors to correspond to queries having a high level of execution and subsequent selection of item information.

The address component 424 defines an address associated with the item information to include descriptors identified by the keyword component. The item information is then accessible by an application program via the defined address. The defined address includes a path to the item information, and a portion of the path includes the identified descriptors. The address, according to some embodiments, is a URL and the address component 424 inserts one or more descriptors into the URL. To enhance the ranking of the URL by a search engine, the descriptors may be placed adjacent, or as close as possible, to the top-level domain in the URL. In some embodiments, the descriptors are placed immediately after the top-level domain in the URL. The descriptors are not placed at the very end of the URL, such as within a query string.

The interface component 422 is operable to provide the address defined by the address component 424 to an entity associated with the item information. This entity may be a retailer, such as an e-commerce web site or online shopping retailer, that sells the product or service and is desirous of a higher relevancy ranking or positioning of its web pages by search engines. As an example, the embodiment of FIG. 4 represents a web service that provides customized URLs to the entity and other like entities based on the queries or other search statistics maintained by the history component 420.

In an embodiment, the address component 424 defines a plurality of the addresses associated with the item information. In such an embodiment, the selection component 425 identifies, based on selection criteria, a subset of the plurality of addresses defined by the address component 424. The subset may be pre-defined in quantity. The subset is selected based on the search statistics, a context of the entity, a segmentation of users searching for the items, and the like. The subset represents, in some embodiments, the addresses having the most relevant descriptors. The descriptors correspond to, for example, popular search keywords, keywords appearing on a top ten list or other favorites list, and any other criteria influencing the addresses to be provided to the entity.

Figure 5:
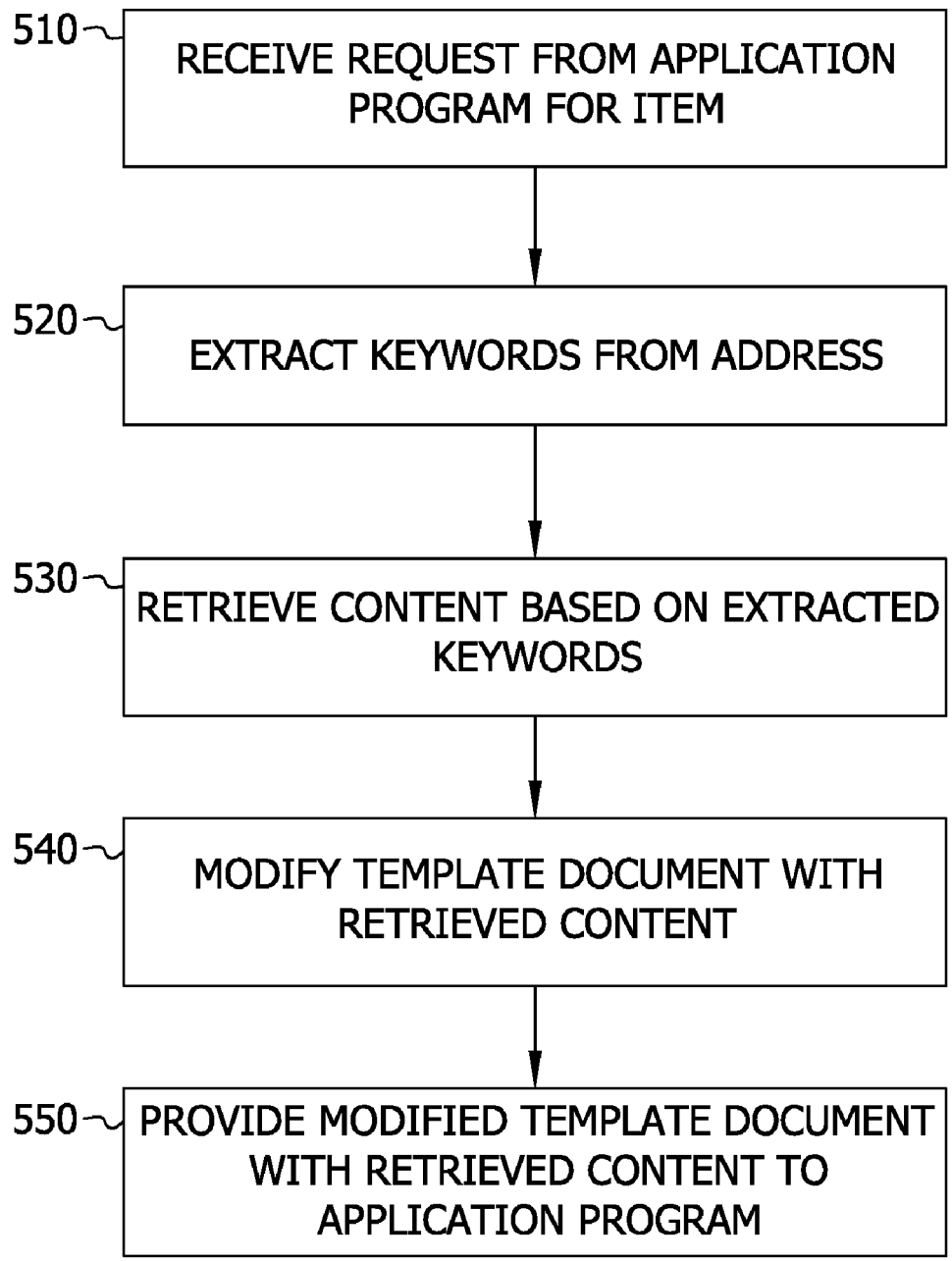
FIG. 5 is an example flow chart for providing a modified template document to an application program.

Referring next to FIG. 5, a flow chart illustrating exemplary methods for providing a modified template document with retrieved content to an application program is provided. The method may be employed in a computing system comprising a memory for storing a template document, content associated with one or more items, and a correspondence between keywords and the content. According to some embodiments, the template document is a template web page containing fields for specific types of information to be inserted into to create a customized web page. The specific types of information are content associated with items. The correspondence between keywords and content associated with items indicates that the keywords describe the content associated with the items. For instance, if the item is an air filter, the content associated with the air filter is a description of the air filter, price of the air filter, image or video representation of the filter, and a list of vehicles that accept the air filter. Example key words or phrases are "air filter", the particular model number of air filter, or the make, model, and year of a vehicle and the phrase "air filter". The keywords may be determined and stored in the memory in accordance with processes described in relation to FIGS. 2-4 above. Those processes include the analysis of a query click log. The query click log contains queries issued by a user and the addresses of content clicked on or selected in response to the queries.

Included in the computing system is a processor programmed to carry out the steps illustrated in blocks 510 through 550 in FIG. 5. The method begins in block 510 with the receiving of a request from an application program for an item. The received request includes an address defining a path to the template document and a keyword embedded in the path. Although not depicted in FIG. 5, the processor is also operable to have previously defined an address to include keywords. The address is then subsequently included in the request received in block 510.

According to some embodiments, the keywords may include one or more of the following: a make of vehicle, a model of a vehicle, an automotive part number, or an automotive part description. The keywords may be identical to those input by a user into the search engine. In the air filter example, the address, in some embodiments, is http://www.*******.com/1997-XYZ-sedan/air-filter. The keywords embedded in the address are "1997 XYZ sedan" and "air filter".

The keyword is extracted from the address in block 520 in response to the request received in block 510. Other information included in the address, such as the domain name, may be identified in order to aid in the extraction of the keyword. In the example above, "1997 XYZ sedan" and "air filter" are extracted from the address.

Content stored in the memory is retrieved in block 530 based on the extracted keywords and the correspondence stored in the memory. The keywords are compared against the correspondence stored in the area to determine the content. In the example above, the keywords "1997 XYZ sedan" and "air filter" are compared in the database to determine products (e.g., items) that correspond to both keywords. This results in the identification of an air filter for a 1997 XYZ sedan. Content for this particular air filter is then retrieved. The content includes an audio, video, or image file representing the air filter, a description of the air filter, a price of the air filter, or information describing the availability of the air filter.

In block 540, the template document is modified with the content retrieved in block 530. The template document is modified to incorporate the retrieved content. For instance, the template document has fields for content describing particular aspects of the item, such a field for a video of the item, a field for a description of the item, and a field for a price of the item. The retrieved content corresponding to these fields in the template documents is inserted accordingly, resulting in a modified template document.

The modification of the template document is dynamic in nature, and occurs in response to the receiving of a request including an address and keywords embedded in the address describing an item. In the air filter example, the template document is a template web page as depicted in FIG. 6, below. The template web page has fields for different types of content relating to the air filter or other item. Fields are dedicated to product information content, an image of the product, and a price of the product. Content corresponding to these fields is inserted into the template web page, resulting in a modified template web page that has been customized for the particular air filter.

At block 550, the modified template document and retrieved content is provided to the application program. When the application program is a web browser in some embodiments, the modified template document is communicated over the network to the client computing device and presented to the user. In embodiments where the application program is a web crawler, the modified template document is communicated to a server operating the web crawler.

Figure 7:
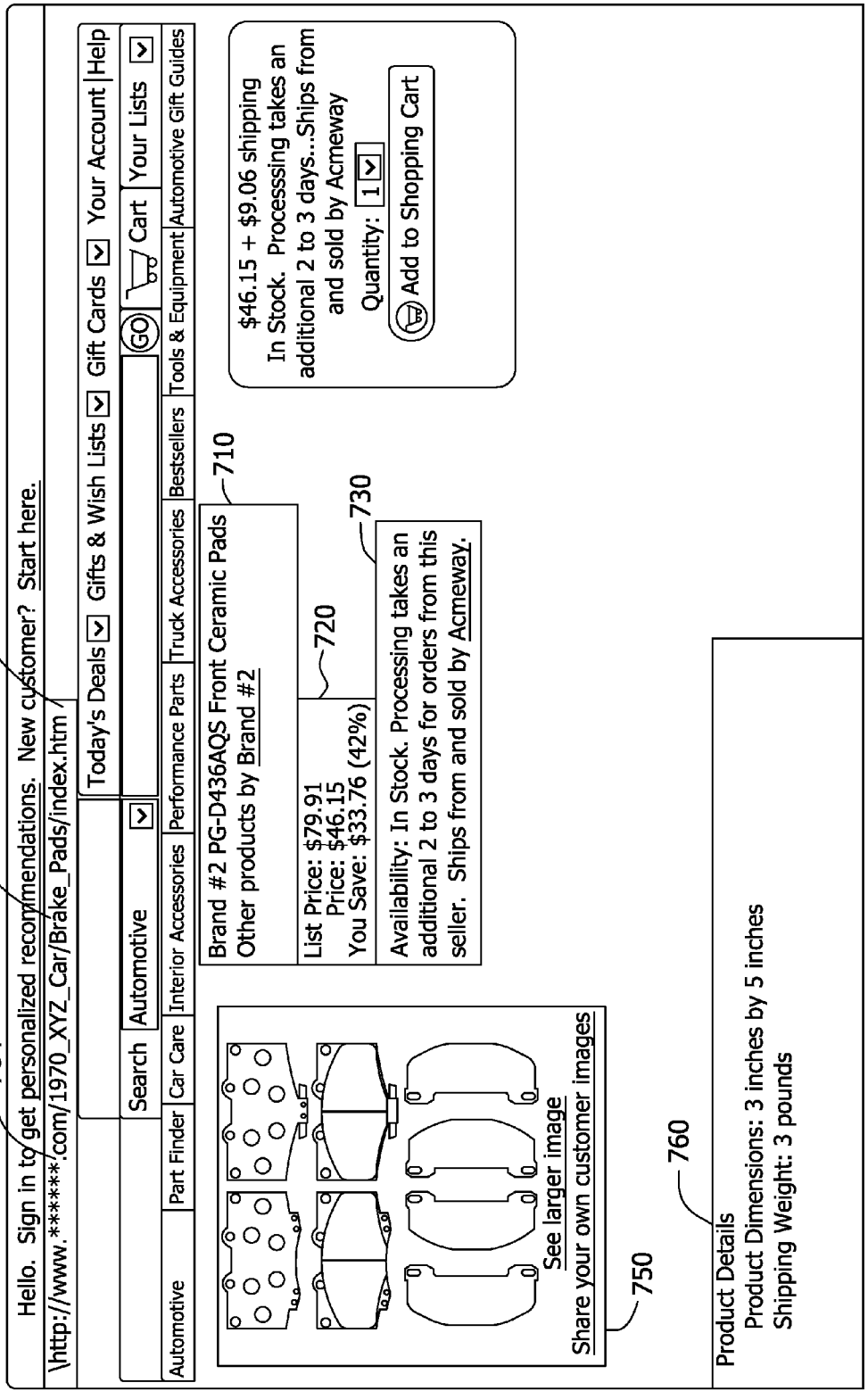
FIG. 7 is an example screen shot of a web page having a product description and an address including content descriptors.

FIGS. 6 and 7 provide screen shots for embodiments dealing with automotive parts. The screen shots are provided for an exemplary nature only and are not intended to limit the scope of the embodiments. To the contrary, a plurality of products, services, and other offerings are contemplated in addition to those delineated herein. In addition, while FIGS. 6 and 7 depict web pages, other modes of information delivery are contemplated as well, including database interfaces and documents in general.

FIG. 6 is an example screen shot of a product description on the web site of an e-commerce retailer. The screen shot is that of a web browser presenting a template web page maintained on a web site of an e-commerce retailer. The template web page defines the layout and types of information that are displayed in a customized web page. Information is retrieved from a database and placed in the open fields to generate a customized web page in response to a request, as discussed above in relation to FIGS. 1-5.

Included in the template web page are a product identification field 610, price information field 620, availability information field 630, product image field 650, and product information field 660.

The product identification field 610 is a space in the template web page reserved for providing basic identification information about the product such as a product name and part number. This information is sufficient for a customer to identify the product. The price information field 620 is reserved for presenting various prices of the product, such as a list or retail price and a discounted price. Availability information field 630 is reserved for informing the user of whether the e-commerce retailer has the product in stock.

Product picture field 650 defines a portion of the template web page for presenting a picture of the product. Product information field 660 is reserved for detailed information about the specifications and features of the first product. This information is more detailed than the cursory identification information provided in the product identification field 610.

FIG. 7 is an example screen shot of a customized web page on the web site of an e-commerce retailer. The screen shot is that of a web browser presenting a web page maintained on a web site of an e-commerce retailer. The web site has been generated by retrieving product-specific information from a database and inserting it into a web page template similar to that depicted in FIG. 6.

Included in the customized web page are a resource address field 702, top-level resource identifier 704, descriptors 706, product identification 710, price information 720, availability information 730, product image 750, and product information 760.

Resource address field 702 is a space reserved within the web browser for displaying the address of the web page currently being presented. The address may be either a URL or a directory structure address. Included within the resource address field 702 is the top-level resource identifier 704. The top-level resource identifier 704 is a domain name in some embodiments. Descriptors 706 are associated with a product and serve to identify the product. In the example provided in FIG. 7, the descriptors are keywords that define a product—brake pads for a 1970 XYZ car. Other types of descriptors are contemplated as well, such as terms, codes, serial numbers, or any other form of information that identifies a product.

The product identification 710 provides basic identification information about the product such as a product name and part number. This information is sufficient for a customer to identify the product. The price information 720 presents various prices of the product, such as a list or retail price and a discounted price. Availability information 730 informs the user of whether the e-commerce retailer has the product in stock.

Product image 750 presents a picture of the product. Product information 760 provides detailed information about the specifications and features of the product. This information is more detailed than the cursory identification information provided in the product identification 710.

Exemplary Operating Environment

A computing device, computer, or client computing device such as described herein has one or more processors or processing units and a system memory. The computer typically has at least some form of computer readable media. Computer readable media, which include both volatile and nonvolatile media, removable and non-removable media, may be any available medium that may be accessed by computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although described in connection with an exemplary computing system environment, embodiments are operational with numerous other general purpose or special purpose computing system environments or configurations. The computing system environment is not intended to suggest any limitation as to the scope of use or functionality of any aspect.

Moreover, the computing system environment should not be interpreted as having any dependency or requirement relating to any one or combination of components illustrated in the exemplary operating environment. Examples of well known computing systems, environments, and/or configurations that may be suitable for use with aspects include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects may be implemented with any number and organization of such components or modules. For example, aspects are not limited to the specific computer-executable instructions or the specific components or modules illustrated in the figures and described herein. Other embodiments may include different computer-executable instructions or components having more or less functionality than illustrated and described herein.

The embodiments illustrated and described herein as well as embodiments not specifically described herein but within the scope of aspects constitute exemplary means for analyzing a query click log to determine keywords and associated content, exemplary means for defining the address to include the keywords, and exemplary means for improving search engine rankings for web pages associated with the items by dynamically modifying the template document to include the retrieved content.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects.

When introducing elements of aspects or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects in detail, it will be apparent that modifications and variations are possible without departing from the scope of aspects as defined in the appended claims. As various changes could be made in the above constructions, products, and methods without departing from the scope of aspects, it is intended that all matter contained in the above description and shown in the accompanying drawings shall be interpreted as illustrative and not in a limiting sense.

What is claimed is:

1. A method for enabling dynamically generated web pages to be indexed and ranked, said method comprising:
    receiving a search query associated with a product;
    defining one or more descriptors associated with a product based on the search query;
    defining a uniform resource locator (URL) associated with a template web page to include the identified descriptors, wherein the template web page is accessible by a web crawler via the defined URL, wherein the defined URL includes a path to the template web page, and wherein at least a portion of the path to the template web page includes the identified descriptors;
    subsequently receiving a request from the web crawler for the template web page, said received request including the defined URL with the identified descriptors;
    extracting at least one of the descriptors from the defined URL responsive to the received request;
    determining content for the product based on the extracted at least one of the descriptors;
    dynamically modifying the template web page to include the determined content to create a customized web page; and
    providing the customized web page to the web crawler, wherein the web crawler indexes the defined URL and the customized web page.

2. The method of claim 1, wherein accessing the one or more descriptors comprises accessing one or more of the following: a term, a code, a keyword, and a phrase.

3. The method of claim 1, wherein defining the URL comprises defining a clean URL.

4. The method of claim 1, wherein defining the URL to include the accessed descriptors comprises inserting the identified descriptors into the path of the URL.

5. The method of claim 1, wherein defining the URL comprises including at least one of the accessed descriptors immediately after a top-level domain in the URL.

6. A system comprising:
    a memory for storing a template document, content associated with one or more items, and a correspondence between keywords and the content; and
    a processor programmed to:
    receive a search query associated with the one or more items, the search query comprising one or more of the keywords;
    receive a request from an application program for at least one of the one or more items stored in the memory, said received request including an address defining a path to the template document, wherein the address has at least one of the one or more keywords corresponding to the content of the at least one of the one or more items embedded in the path;
    extract the at least one of the keywords from the address responsive to the received request;
    retrieve the content stored in the memory based on the extracted at least one of the keywords and the correspondence stored in the memory;
    modify the template document with the retrieved content; and
    provide the modified template document with the retrieved content to the application program.

7. The system of claim 6, wherein the keywords comprises one or more of the following: a make of a vehicle, a model of a vehicle, an automotive part number, and an automotive part description.

8. The system of claim 6, wherein the keywords are identical to search terms input by a user into a search engine.

9. The system of claim 6, further comprising means for analyzing a query click log to determine keywords and associated content.

10. The system of claim 9, wherein the query click log contains queries issued by a user and addresses of content clicked on in response to the queries.

11. The system of claim 6, further comprising means for defining the address to include the keywords.

12. The system of claim 6, further comprising means for improving search engine rankings for web pages associated with the items by dynamically modifying the template document to include the retrieved content.

13. One or more non-transitory computer-readable media having computer-executable components, said components comprising:
- a history component for maintaining search statistics corresponding to one or more search queries associated with a plurality of items, said search statistics being associated with a search engine;
- a keyword component for identifying one or more descriptors associated with item information for each of the plurality of items based on the search statistics maintained by the history component;
- an address component for defining a plurality of addresses associated with the item information for each of the plurality of items, said defined addresses including at least one of the descriptors identified by the keyword component, wherein the item information is accessible by an application program via the defined addresses, wherein the defined addresses include a path to the item information, and wherein at least a portion of the path to the item information includes the identified descriptors;
- a selection component for identifying, based on selection criteria, a subset of the plurality of addresses defined by the address component; and
- an interface component for providing the addresses identified by the selection component to an entity associated with the item information.

14. The non-transitory computer-readable media of claim 13, wherein the statistics comprise one or more of the following: log queries for the item information, a click-through conversion rate, and a frequency of keyword searches for the item.

15. The non-transitory computer-readable media of claim 13, wherein the selection component identifies the subset of the plurality of addresses by selecting a predefined quantity of the addresses based on one or more of the following: the search statistics, a context of the entity, and segmentation of users searching for the items.

16. The non-transitory computer-readable media of claim 13, wherein the item information corresponds to a product for sale, and wherein the interface component provides the address to an online shopping retailer.

17. The non-transitory computer-readable media of claim 13, wherein the history component maintains a frequency of execution for each of the queries, and wherein the keyword component defines the descriptors to correspond to the queries having a high frequency of execution.

18. The non-transitory computer-readable media of claim 13, wherein the address comprises a uniform resource locator (URL), and wherein the address component inserts the at least one of the descriptors into the URL immediately after a top-level domain of the URL.

19. A method comprising:
- receiving a search query associated with a product;
- defining one or more descriptors associated with an offering based on the search query;
- defining an address associated with a first item of content to include the identified descriptors, wherein the first item of content is accessible by an application program via the defined address, wherein the defined address includes a path to the first item of content, and wherein at least a portion of the path to the first item of content includes the identified descriptors;
- subsequently receiving a request from the application program for the first item of content, said received request including the defined address with the identified descriptors;
- determining at least one of the descriptors from the address responsive to the received request;
- identifying a second item of content for the offering based on the determined at least one of the descriptors;
- associating the identified second item of content with the first item of content; and
- providing the first item of content with the identified second item of content to the application program.

20. The method of claim 19, wherein accessing the one or more descriptors comprises accessing the one or more descriptors associated with one or more of the following: a product, service, and social profile.

21. The method of claim 19, wherein defining the address associated with the first item of content comprises defining the address associated with one or more of the following: a web page, a database record, and a word processing document.

22. The method of claim 19, wherein accessing the one or more descriptors comprises accessing the one or more descriptors based on one or more of the following: a user-defined search term, a web log, and a browser history.

23. The method of claim 19, wherein associating the identified second item of content with the first item of content comprises modifying a title of a document to include the second item of content, modifying a description of a document to include the second item of content, and modifying a meta-description of the document to include the second item of content.

24. The method of claim 19, wherein the first item of content comprises a video, and the second item of content comprises metadata associated with the video.

25. The method of claim 19, wherein defining the address comprises defining a plurality of addresses associated with the first item of content, and further comprising:
- selecting, based on selection criteria, a subset of the plurality of addresses; and
- providing the application program with access to the selected subset.

26. The method of claim 25, wherein selecting the subset comprises selecting the subset of the plurality of addresses based on the application program.

* * * * *

UNITED STATES PATENT AND TRADEMARK OFFICE
CERTIFICATE OF CORRECTION

PATENT NO. : 8,126,868 B1
APPLICATION NO. : 12/256277
DATED : February 28, 2012
INVENTOR(S) : Brent Allen Vincent It is certified that error appears in the above-identified patent and that said Letters Patent is hereby corrected as shown below:

In the Claims

Column 14, line 56 (claim 7): change "comprises" to --comprise--.

Signed and Sealed this
Twenty-second Day of October, 2013

Teresa Stanek Rea
*Deputy Director of the United States Patent and Trademark Office*